Nov. 16, 1965  F. P. CARUTHERS  3,218,591
TRANSDUCER ASSEMBLY
Filed May 9, 1960 3 Sheets-Sheet 1
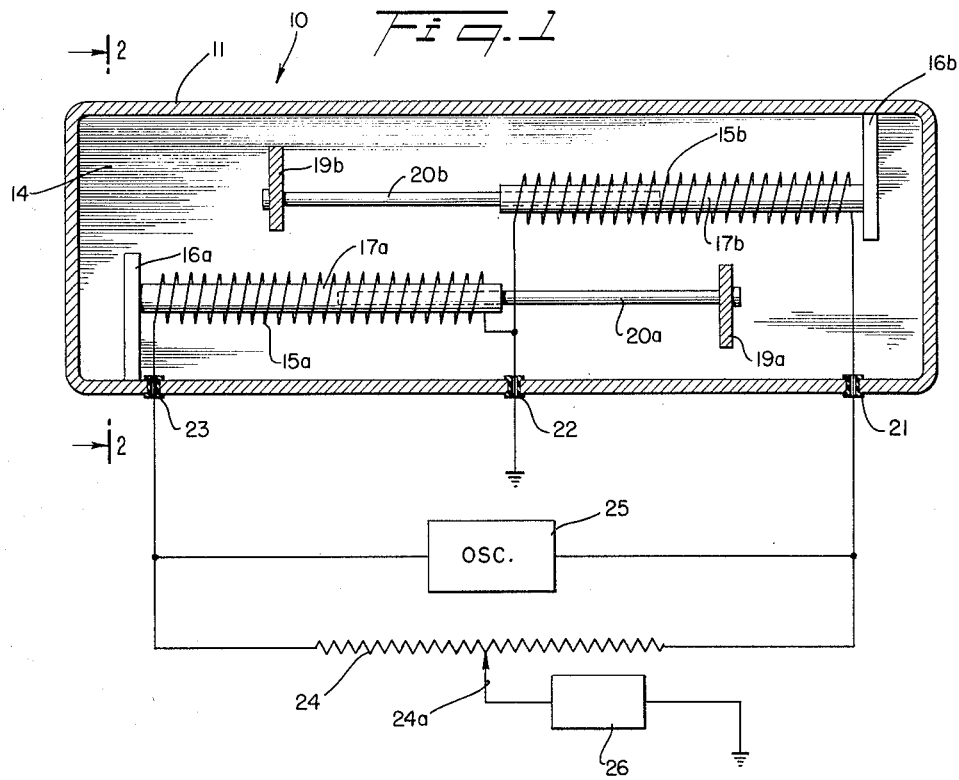
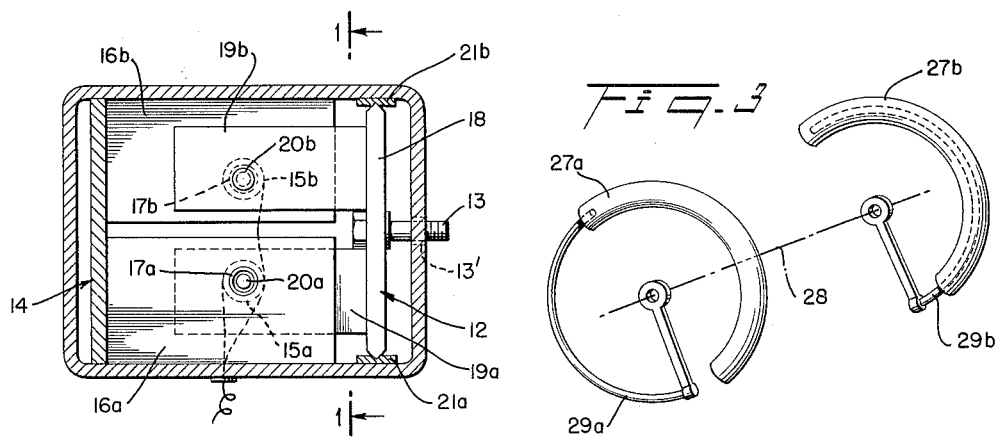
INVENTOR.
FELIX PORTER CARUTHERS Nov. 16, 1965 F. P. CARUTHERS 3,218,591
TRANSDUCER ASSEMBLY
Filed May 9, 1960 3 Sheets-Sheet 2
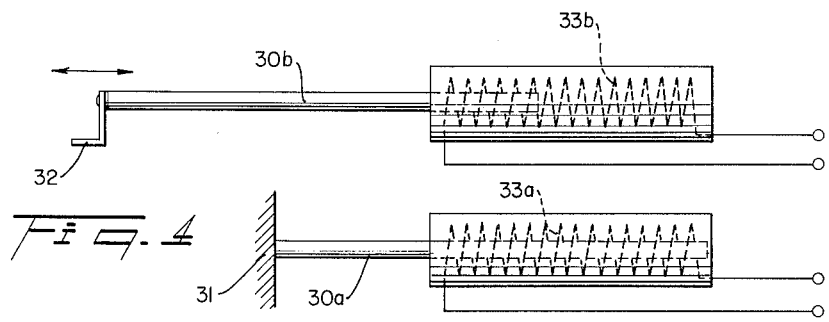
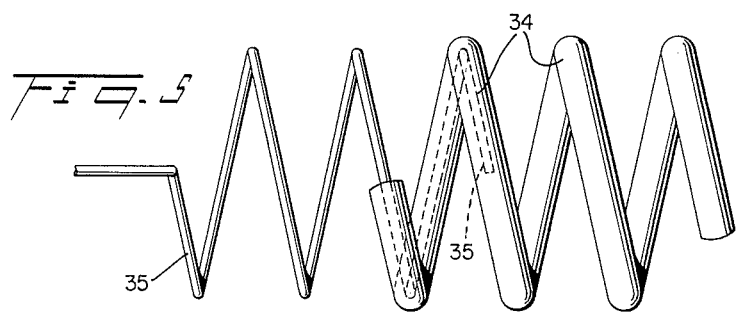
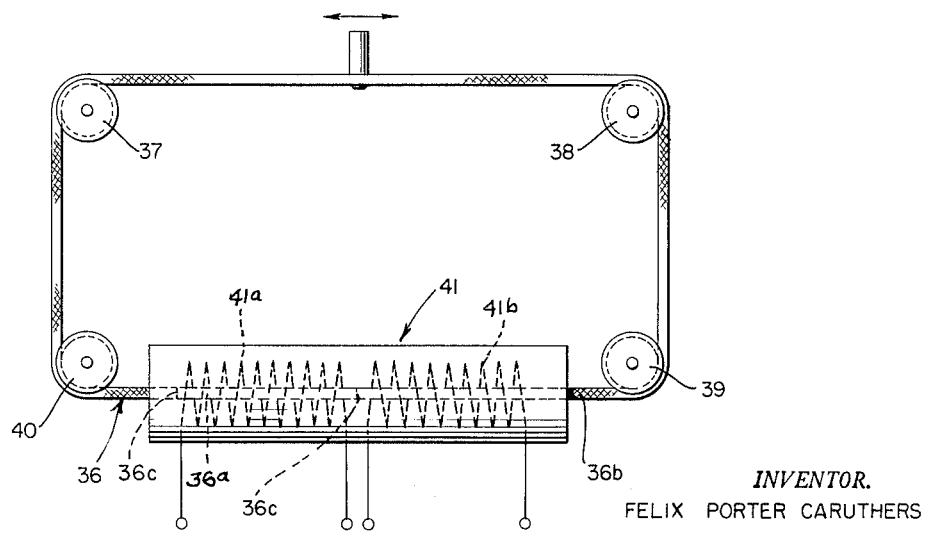
INVENTOR.
FELIX PORTER CARUTHERS Nov. 16, 1965  F. P. CARUTHERS  3,218,591

TRANSDUCER ASSEMBLY

Filed May 9, 1960  3 Sheets-Sheet 3

INVENTOR.
FELIX PORTER CARUTHERS

United States Patent Office 3,218,591
Patented Nov. 16, 1965

3,218,591
TRANSDUCER ASSEMBLY
Felix Porter Caruthers, Syosset, N.Y., assignor, by mesne assignments, to Automated Specialties, Incorporated, Charlottesville, Va., a corporation of Virginia
Filed May 9, 1960, Ser. No. 27,618
2 Claims. (Cl. 336—131)

This invention relates to transducers and more particularly to variable impedance transducers for use as sensors or the like and which are compact in relation to the motions involved, which afford improved linearity in operation, and which are capable of rectilinear or rotary motions or combinations thereof in extremely large amplitudes.

Transducers have been developed to indicate accurately the positions of relatively movable parts. Such transducers take the form of an elongated coil which receives a movable elongated ferromagnetic core to afford an output parameter indicative of precise position. In a typical arrangement, the coil assembly is connected as two arms of an impedance bridge circuit which can be nulled or balanced by means, for example, of its other arms, to obtain an indication of core position and, it follows, a means for determining repeatedly thereafter when the movable core reaches that position. Such devices, when used to measure rectilinear motion, are commonly called variable permeance transducers. When applied to machine tools such as a lathe, for example, they are useful for determining the precise positions of the slides. However, the maximum length of a transducer assembly of the type described above is large, normally approaching three times the travel of the moving part. For many applications, and particularly on a lathe or other machine tool, this can result in an inconvenient overhang which is hazardous, both to the transducer unit, which is a precision piece, and to the operating personnel, who work closely adjacent thereto.

Accordingly, it is one object of the present invention to provide an improved transducer or sensor which is useful as part of an impedance bridge and having dimensions which can be made considerably less than conventional transducers of the same class.

Another object of the invention is to provide a variable transducer assembly which affords good linearity over its operating range.

Another object of the invention is to provide an improved transducer assembly which is capable of extremely large amplitudes of motion.

In accordance with one embodiment of the present invention, there is provided a transducer assembly having an elongated coil which is divided into two parts, the axes of which are generally parallel but laterally offset. Two movable core sections, mounted on a common support, are provided for the respective coil sections, also mounted on a common support. In a representative installation, the support for the core sections can take the form of the movable or input member and the support for the coil sections the fixed member, although it will be understood that either or both can be movable to suit particular design problems. The coil and core sections are so arranged that as input movement obtains, one core will move out of its coil section while the other core moves into its coil section to achieve the desired impedance differential. In this fashion, the transducer assembly, which is adapted to be connected in an impedance bridge energized by a suitable A.C. source such as an oscillator, is reduced in its over-all dimensions. In a rectilinearly movable unit, for example, the length in its most extended position is approximately two times the travel of the movable or input member.

In another embodiment of the invention, a sequential transducer can be provided by means of an extended core portion formed of a series of sections which are alternately magnetic and non-magnetic. The coil assembly through which the core travels can be formed of a series of axially aligned coil portions supported on a common mandrel. The coil portions are preferably paired, with each successive pair being movable on the mandrel to effect adjustment of mutual inductance. Magnetic end portions for the coil assemblies are also adjustable to correct for core and mandrel losses.

Representative embodiments of the invention are described below having reference where appropriate to the accompanying drawings in which:

FIGURE 1 is a view in longitudinal section, taken on the line 1—1 of FIGURE 2 and partly diagrammatic in nature, of a variable transducer assembly shown connected schematically, in a typical bridge circuit;

FIGURE 2 is a view in transverse section taken on the line 2—2 of FIGURE 1;

FIGURE 3 is a diagrammatic view in perspective of a modified form of the transducer unit;

FIGURE 4 is a diagrammatic view of a modified transducer assembly;

FIGURE 5 is a diagrammatic view of still another modification of the transducer assembly;

FIGURE 6 is a diagrammatic view of a multiple section of coil and core arrangement in which the core is flexible to afford increased length;

Figure 7:
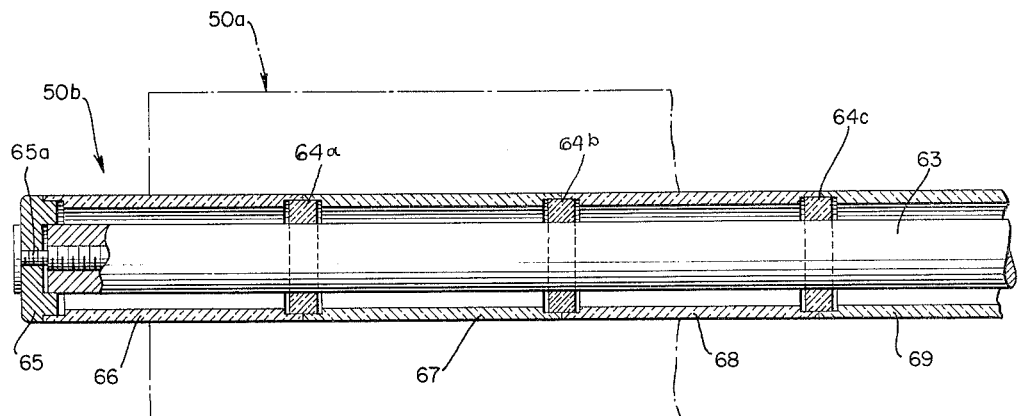
FIGURE 7 is a view in transverse section of the movable and fixed portions of an electromagnetic transducer assembly.

Referring to the drawing, there is illustrated a variable transducer indicated generally by the numeral 10 which includes a frame and casing assembly 11, normally fixed, and a moving or slide assembly 12 to which an input or driving member 13 (FIGURE 2) is connected. The frame assembly 11 includes a fixed support 14 secured to the casing and on which are mounted a pair of coil sections 15a and 15b on parallel axes, in laterally offset relationship. The coil sections 15a and 15b are held by supporting members 16a and 16b, respectively, secured to the support 14. The coil sections 15a and 15b can be wound on non-magnetic, tubular mandrels 17a and 17b, respectively, anchored to the members 16a and 16b.

The slide assembly 12 includes a slide plate 18 carrying support arms 19a and 19b to which are affixed, in cantilever fashion, a pair of core sections 20a and 20b. The core sections 20a and 20b modify the impedance of the coil sections 15a and 15b, respectively, by passing into and out of the tubular mandrels thereof. The parts are so arranged that as one core section is moving into its complementary coil section, the other is moving out of its coil section. The plate 18 is slidably mounted on the casing 11 as by slide tracks 21a and 21b on opposed inner surfaces of the casing. The length of the support 18, which is approximately equal to the distance between the support arms 19a and 19b, is such that the core sections 20a and 20b can be moved, respectively, fully into their corresponding coil sections or fully out, in inverse relationship, without being blocked by the ends of the housing 11. The input member 13, which can take the form of a transverse pin, is secured to the plate 18 and extends out of the casing 11 through a slot 13' to actuate the core assembly. The core sections 20a and 20b are formed of a suitable magnetic material, preferably of low permeability, with the remainder of the structure being formed of non-magnetic material.

In order to operate the transducer unit in a typical circuit, a series of three terminals 21, 22 and 23 are provided, of which the terminal 23 is connected to the inner ends of both coil sections 15a and 15b and the other two of which are connected to the outer ends thereof. A typical impedance bridge circuit is shown schematically in FIGURE 1, including a wound resistor 24 connected across the two coil sections 15a and 15b and having a slide tap 24a. An oscillator 25 is connected across one bridge diagonal and an output or null detector 26 is connected across the other diagonal, the latter including a ground connection at the terminal 23 common to the two coil sections.

By means of the arrangement of the present invention, not only is the over-all length of the assembly reduced from three times the travel of the moving part, as in conventional transducers of generally similar type, to two times the travel, but better linearity is achieved for corresponding precision in manufacture, this due to an improvement in the flux paths which results from the offset or split arangement described above.

While the invention has been described having reference to a preferred embodiment thereof, it should be understood that it can take various other forms and arrangements. Thus, for example, the slide mounting of the support 18 to which the input member 13 is connected, can be carried by the end pieces of the assembly rather than from the top and bottom walls of the housing casing 11. Also, as disclosed in FIGURE 3, the transducer unit can be arranged, in accordance with the invention, for rotary rather than rectilinear input motion. In FIGURE 3, which for simplicity is partly diagrammatic in nature, there are included two coil sections 27a and 27b, each curved on a radius about an axis 28, representing the rotary input means. Coupled to the shaft 28 for concurrent movement are a pair of core sections 29a and 29b, respectively curved on radii corresponding to those of the coil sections 27a and 27b. The core sections 29a and 29b are angularly displaced and oppositely directed on the drive means 28 so that as the drive means is rotated, one core section will be entering its corresponding coil section while the other is leaving. In this fashion, the differential action characteristic of the arrangement of FIGURE 1 obtains, it being understood that the two coil sections are connected electrically in a manner similar to the arrangement of FIGURE 1.

In the arrangement of FIGURE 3, the coil section 27a and its corresponding core section 29a (as well as the coil section 27b and its core section 29b) are disposed in coplanar relationship. Accordingly, the angular movement of the drive means 28 will be limited to no more than approximately 180°. If greater angular movement is desired, the coil and core sections can be formed as helixes. If preferred, in accordance with the invention, the two coil sections 27a and 27b can be wound two as one in a common helix, with the core sections 29a and 29b entering opposite ends, axially speaking. Devices formed in accordance with the present invention, in some cases rotary and in other cases rectilinear, can be widely applied. They find utility, for example, in controlling machine tools, gauging angular position, pressure, flow and temperature, measuring absolute and differential torque, acceleration, and the like. The circuitry can be varied to suit specific needs. For example, single and multiple null-type or direct read-out circuits can be balanced against potentiometers or other similar transducers, both inductive and capacitance. Non-linear coils can be used to give longer linear inductance change with the same over-all physical length.

Referring to FIGURE 4, there is illustrated an arrangement in accordance with the present invention which is particularly useful for obtaining readings which are relatively more coarse than those which can be obtained by the arrangement of FIGURE 1, for example. This can be accomplished by separating the two core portions in the manner of FIGURE 1 and immobilizing one core portion. To this end, the core portion 30a is fixed to the frame 31 and the core portion 30b is mounted on a movable carrier 32. The coil sections 33a and 33b are associated with the cores 30a and 30b, respectively, the former being relatively fixed. By connecting the coils 33a and 33b in a bridge circuit corresponding, for example, to that of FIGURE 1, a system of similar electrical properties is obtained although sacrificing certain accuracy in performance. However, with half of the system, including the core 30a and the coil 33a immobilized, this portion of the system can be extensively simplfied in its geometry and cost of manufacture. Not only can it be made to consume less space, but it can be mounted at a relatively remote point for convenience.

Referring to FIGURE 5, there is illustrated an arrangement of the invention in which the coil 34 and core 35 sections are formed as helixes. In FIGURE 5, only single coil and core sections are illustrated, although multiple units can be provided. It will be understood that in rotating, the core 35 moves progressively further into the helix, and therefore is capable of a plurality of rotations, whereas the arrangement of FIGURE 3 is limited to approximately 180° of rotation. Rotary motion of slightly less than 90° can be provided by a further simplification of the structure wherein a single 180° segmental core is supported by a radius arm at its center point. The coil, on the curvature and having a common center axis, extends for 270° of arc and receives alternately the two halves of the core moving in opposite directions. Insofar as the circuit arrangement is concerned, it will be understood that a pair of coils and cores, all of helical forms, are utilized in the manner of the arrangement of FIGURE 1, and that a similar bridge circuit is used.

Referring to FIGURE 6, there is illustrated an arrangement in which a core 36 assembly is flexible, taking the form of a stranded cable connected in an endless configuration over guide pulleys 37, 38, 39 and 40, one straight limb of the cable passing through a coil 41 assembly including two coil sections 41a and 41b. The core 36 includes two core portions 36a and 36b, the latter of magnetic and the former of non-magnetic material, abutted at joints 36c. The non-magnetic section is approximately the length of one coil section so that as the core is moved the inductance of one coil section changes relative to the other. As illustrated, the core sections are arranged end to end. If desired, the core sections can take the form of two different loops.

If desired, the core slug 36a can be formed of magnetic material and the portion 36b of non-magnetic material. In either case, as the core is moved so that the joint 36c which is disposed between coil sections 41a and 41b moves either to the right or left of center, a differential signal is generated by the imbalance, for example, of a bridge circuit, going either positive or negative, depending on the direction of movement. Also, the slug 36a moving into the outer end of either coil section will generate a signal, all as described above in connection with FIGURES 1 and 2. The flexible core arrangement can be used for coarse measurements, using the illustrated or other pulleys to carry the drive motion to more convenient locations on an installation.

Figure 8:
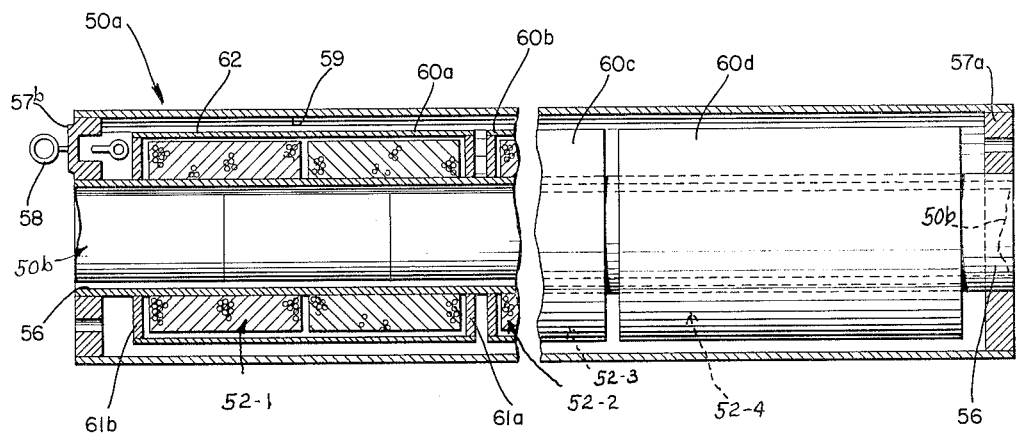
FIGURE 8 is a fragmentary view in longitudinal section of a portion of the movable transducer element of FIGURE 7 showing the assembly of electrical windings thereon.

Referring to FIGURES 7 and 8, there is illustrated a transducer assembly, including a fixed coil assembly 50a and movable core assembly 50b, both being partially illustrated in FIGURE 7. The coil assembly 50a, which is best seen in FIGURE 8, is particularly useful as part of a machine tool control system and to that end is adapted to be supported by the frame of a machine tool. The coil assembly includes a tubular stainless steel mandrel or center 56 supporting a series of coil sections 52–1, 52–2, 52–3 and 52–4. Each section includes a pair of magnetic end rings or washers 61a and 61b supporting a cylindrical shield 62 formed of magnetic material and slotted axially. The slots, which are not illustrated in the figure, reduce hysteresis losses and afford a path through which the electrical leads (also not shown) to the coils may be brought out, to connect each pair of coils in the manner of the coils 15a and 15b of FIGURE 1.

By virtue of the illustrated arrangement of the fixed portion of the transducer assembly, the capacity is symmetrical and the inductance, as well as the mandrel and core losses, are fixed. Therefore, the zero phase frequency of a plurality of coils can be matched within close limits, say, five cycles. Also, there can be connected in parallel a large number of coils for any given excitation frequency.

In assembling the fixed portion 50a, it will be observed that movement of the coil assemblies apart or together on the mandrel 56 affords an adjustment for mutual inductance. Also, by moving the end washers or pieces 61a and 61b of each coil assembly along the axis of the mandrel, core and mandrel losses can be corrected. Preferably, the voids between the shield 62 and the mandrel 56 which is not filled by the coil assembly, is filled with a potting compound injected through suitable openings in the end pieces 57a and 57b.

The movable portion 50b, best illustrated in FIGURE 7, includes a central tubular core portion 63, carrying along its length a plurality of spacers 64a, 64b, 64c and, at either end, an end piece 65 coupled by screw member 65a to the core portion 63. Carried by the end piece and the spacers, working from left to right in FIGURE 7, are a series of cylindrical sleeve portions 66, 67, 68, 69, etc. The sleeve portions are alternately non-magnetic and magnetic, proceeding along the length of the unit. In order to afford a continuous outer surface for the movable portion 50b, the respective sleeve elements 66, 67, 68, etc., are notched or recessed on their inner end surfaces to rest on the end end pieces 65 and spacers 64a, b, c etc. Preferably, the recessed portion of each element is slightly in excess of one-half of the length of the spacers. The unit may assume any length compatible with its structural integrity, and in the illustrated arrangement the alternate magnetic and non-magnetic sections are one inch in length, thereby to yield, in an operative transducer system, output responses for each one-half inch of travel. The sleeve elements 66, 67, 68 etc. can be tightly compressed axially to form a rigid integrated structure by adjusting the screw 65a.

A representative utilization of the transducer of FIGURES 7 and 8 is illustrated in the applicant's co-pending application Serial No. 50,035 filed August 16, 1960. In that utilization, which is a machine tool controller, the first coil section 52-1 is connected in a bridge follower circuit corresponding, for example, to that illustrated in FIGURE 1, and the three successive coil sections 52-2, 52-3 and 52-4 are connected to binary counters through electronic switches such, for example, as "and gate" circuits. The bridge follower circuit, including the first coil section 52-1, is also connected to the binary counters through an "and gate" circuit so that fractional inch measurements or indications might be derived after the desired number of unitary or one-inch segments have been counted, all as described and illustrated in the said co-pending application.

While the invention has been described above having reference to preferred embodiments thereof, it will be understood that the invention can take various other arrangements which will suggest themselves to those skilled in the art. It will be understood, for example, that the coil, rather than the core section, can be movable, or both can be moved, it being necessary only that there be relative movement between the two. Also, two transducer units can be heat sinked together so that only the relative temperature change between the two will affect the readings. In this fashion, higher accuracies can be obtained as might be required, for example, in machine tools such as grinders. It will be understood further that the multiple core and coil configurations of FIGURES 7 and 8 can be applied to the basic designs of FIGURES 1–6. The invention should not, therefore, be regarded as limited except as defined by the following claims.

I claim:

1. In a transducer at least two series-connected coaxial coil sections, a terminal connected between the coil sections and a pair of terminals connected, respectively, to the ends of the respective coil sections to afford energization of the transducer in an impedance bridge circuit, and a core assembly including a plurality of sections of alternately magnetic and non-magnetic material movable concomitantly to pass through the coil sections, each of said core sections being of substantially the same length as the coil sections, said core assembly including a central tubular core member, a series of radially extending spacer members carried by the core member along its length, said alternate magnetic and nonmagnetic sections of the core assembly comprising sleeve members surrounding the tubular core member spaced therefrom and carried by said spacer members, said magnetic and nonmagnetic sections being disposed in the end-to-end abutting relationship and said spacers being disposed at the respective abutment points.

2. In a transducer as set forth in claim 1, including a pair of end pieces attached to said central core member, and screw means coupling at least one of the end pieces to the central core member to shift the end piece axially of the core member to compress the said alternate magnetic and nonmagnetic sections in end-to-end relationship.

References Cited by the Examiner

UNITED STATES PATENTS

| 2,149,336 | 3/1939 | Darnell | 336—136 |
| 2,389,986 | 11/1945 | Koch | 336—136 X |
| 2,630,559 | 3/1953 | Whittier | 336—30 X |
| 2,662,223 | 12/1953 | Brewer | 336—30 X |

FOREIGN PATENTS

| 616,240 | 1/1949 | Great Britain. |

JOHN F. BURNS, *Primary Examiner.*

MILTON O. HIRSHFIELD, *Examiner.*